United States Patent [19]

Izumi et al.

[11] Patent Number: 4,667,943
[45] Date of Patent: May 26, 1987

[54] RESILIENT BUSHING

[75] Inventors: Toshio Izumi, Toyota; Fukuyoshi Kawakatsu, Inuyama, both of Japan

[73] Assignees: Tokai Rubber Industries, Ltd.; Toyota Jidosha Kabushiki Kaisha, both of Aichi, Japan

[21] Appl. No.: 755,007

[22] Filed: Jul. 15, 1985

[30] Foreign Application Priority Data

Jul. 16, 1984 [JP] Japan ............................ 59-107326[U]

[51] Int. Cl.⁴ .............................................. F16F 1/38
[52] U.S. Cl. ................................... 267/141.3; 403/228
[58] Field of Search ............... 267/141.1, 141.2, 141.3, 267/141.4; 384/282, 297, 221, 222; 403/227, 228

[56] References Cited

U.S. PATENT DOCUMENTS

| 1,794,782 | 3/1931 | Lord | 403/228 X |
| 3,039,831 | 6/1962 | Thomas . | |
| 3,268,280 | 8/1966 | Miller . | |
| 3,494,676 | 2/1970 | Compton . | |
| 3,666,301 | 5/1972 | Jorn | 403/228 |
| 4,007,924 | 2/1977 | Jorn et al. | 403/228 X |
| 4,491,429 | 1/1985 | Matoba et al. | 384/222 X |

FOREIGN PATENT DOCUMENTS

| 229080 | 11/1958 | Australia . | |
| 714689 | 12/1941 | Fed. Rep. of Germany ... | 267/141.2 |
| 697636 | 11/1965 | Italy . | |
| 0064570 | 5/1977 | Japan | 267/141.4 |
| 411622 | 6/1934 | United Kingdom | 403/228 |

Primary Examiner—Duane A. Reger
Attorney, Agent, or Firm—Parkhurst & Oliff

[57] ABSTRACT

A resilient bushing having an inner sleeve, an outer sleeve disposed around the inner sleeve in co-axial and radially-spaced relation thereto, and a cylindrical resilient member interposed between the inner and outer sleeves. The bushing comprises an intermediate sleeve substantially embedded in the cylindrical resilient member in co-axial relation thereto. The intermediate sleeve has a radially outward flange at one or both of its axial ends.

6 Claims, 8 Drawing Figures

RESILIENT BUSHING

BACKGROUND OF THE INVENTION

1. Field of the Art

The present invention relates generally to a resilient bushing which is disposed between two members in a vibration system, for resiliently connecting the two members so as to damp vibrations in the system, and more particularly to such resilient bushing of generally cylindrical shape which comprises an inner and an outer sleeve, and a cylindrical resilient member interposed between the inner and outer sleeves.

2. Related Art Statement

In the art of absorbing or damping vibrations between two members, a resilient bushing is known, which generally includes an inner metal sleeve, an outer metal sleeve disposed around the inner metal sleeve in co-axial and radially-spaced relation with each other, and a cylindrical resilient or rubber member interposed between the inner and outer metal sleeves. Various types of such cylindrical resilient bushings have been proposed and used for meeting different requirements depending upon specific environments in which the bushings are used.

For example, the above-indicated cylindrical resilient bushings are used as arm bushings which pivotally couple suspension arms to a suspension member in an independent suspension system of trailing arm-type in an automotive vehicle. The resilient bushings for this application are required, on the one hand, to exhibit relatively hard spring characteristics in their radial direction, for assuring high driving stability of the vehicle. For improving the driving comfort of the vehicle, on the other hand, the resilient bushings are required to exhibit relatively soft spring characteristics in their circumferential direction, i.e., in the direction of twisting about their axis, in order to prevent deterioration of vibration-damping ability of coil springs supporting the vehicle. For enhanced cornering stability of the vehicle, the bushings are further required to exhibit axial spring characteristics wherein the rate of increase in deflection or strain of the resilient member as a load applied thereto is increased, is reduced at a relatively low level of the load, up to which level the rate of increase in the deflection is relatively high.

Problems Solved by the Invention

However, the resilient bushings with a cylindrical resilient member interposed between the inner and outer metal sleeves tend to provide relatively soft radial spring characteristics. In view of this tendency, it has been proposed to use a rubber material of relatively high hardness, e.g., Hs70 or so, for the resilient member. In this case, the dynamic/static ratio (ratio of dynamic spring rate over static spring rate) of the bushings is inevitably increased, and the shock-absorbing or vibration-damping capability of the bushings is lowered, whereby the driving comfort of the vehicle is deteriorated. The use of a relatively hard rubber material causes the bushing to demonstrate relatively hard circumferential spring characteristics, which also deteriorates the driving comfort of the vehicle. Further, the conventional resilient bushing has no means for limiting or restricting axial displacements of the resilient member, which leads to excessive axial displacements of the inner and outer metal sleeves relative to each other. That is, it is impossible to reduce the rate of increase in deflection of the resilient member when a load applied thereto is relatively low. Accordingly, the axial rigidity of the bushing is not sufficient, and a change in toe angle of the vehicle wheels during a cornering run of the vehicle is increased.

SUMMARY OF THE INVENTION

It is accordingly an object of the present invention to provide a resilient bushing which is improved in spring characteristics in its radial, axial and circumferential directions.

According to the present invention, there is provided a resilient bushing having an inner sleeve, an outer sleeve disposed around the inner sleeve in co-axial and radially-spaced relation thereto, and a cylindrical resilient member interposed between the inner and outer sleeves, comprising an intermediate sleeve substantially embedded in the cylindrical resilient member in co-axial relation thereto, the intermediate sleeve having, at least at one end, an outward flange which extends radially outwardly from the axial end.

The intermediate sleeve embedded in the cylindrical resilient member is generally cylindrical in shape, and is made of a rigid material, preferably metals such as iron and steel. This rigid intermediate sleeve serves as effective means for enabling the resilient member to exhibit relatively hard spring characteristics in its radial direction.

According to an advantageous embodiment of the invention, the intermediate bushing separates the resilient member into an inner layer contacting the inner sleeve and an outer layer contacting the outer sleeve, and the outward flange of the intermediate sleeve is at least partially exposed out of the resilient member, an axial displacement of the outer layer of the resilient member being restricted by the outward flange, at one of its opposite axial ends corresponding to the above-identified one axial end of the intermediate sleeve. Preferably, the outward flange may be formed at the opposite axial ends of the intermediate sleeve, for more effective restriction of the axial displacement of the resilient member.

According to another advantageous embodiment of the invention, the inner sleeve, the intermediate sleeve and the resilient member are formed as an integral inner assembly unit, through vulcanization of a fluidized or unvulcanized rubber material in a mold, and the outer sleeve is press-fitted on the inner assembly unit. In this case, the assembling of the resilient bushing is simplified.

In accordance with a preferred form of the above embodiment, the outer sleeve has, at one of its opposite axial ends, an outward flange which extends radially outwardly of the outer sleeve. Preferably, the intermediate sleeve has at least one axial slit which is formed along its axis and open only at its axial end at which the outward flange is provided. The axial slit is filled with a part of the resilient member, and the outer sleeve is press-fitted on the inner assembly unit such that the outward flange of the outer sleeve corresponds to the outward flange of the intermediate sleeve. In this arrangement, the portion of the resilient member corresponding to the length of the axial slit of the intermediate sleeve is radially compressed to a greater degree than the other portion. Due to a difference in the radially inward compression between these two portions of the resilient member, the outer sleeve is protected from axial movement relative to the resilient member in the direction away from the outward flange of the intermediate sleeve.

According to a further preferred form of the above embodiment of the invention, the intermediate sleeve has a first outward flange at one of its opposite axial ends, and a second outward flange at the other axial end. The first outward flange extends radially outwardly of the intermediate flange by a distance which is greater than that of the second outward flange. The resilient member has a ring portion which extends radially outwardly from an axial end thereof. This ring portion adheres to one of opposite surfaces of the first outward flange of the intermediate sleeve which faces the second outward flange. Before the outer sleeve is press-fitted on the inner assembly unit, the width of the ring portion as measured axially of the inner assembly unit is larger at a radially outer part thereof than at a radially inner part thereof. The outward flange of the outer sleeve is held in pressed contact with the ring portion of the resilient member.

According to another advantageous embodiment of the invention, the inner sleeve has two outward flanges at its opposite axial ends, respectively. The outward flanges extend radially outwardly from the respective axial ends of the inner sleeve, so that an axial displacement of the resilient member is restricted by at least one of the two outward flanges of the inner sleeve.

BRIEF DESCRIPTION OF THE DRAWINGS

The foregoing and other objects, features and advantages of the present invention will be better understood from reading the following detailed description of a preferred embodiment of the invention, when considered in conjunction with the accompanying drawings, in which.

DETAILED DESCRIPTION OF THE PREFERRED EMBODIMENT

To further clarify the concept of the present invention, a preferred embodiment of the invention will be described in detail by reference to the accompanying drawings.

Figure 1:
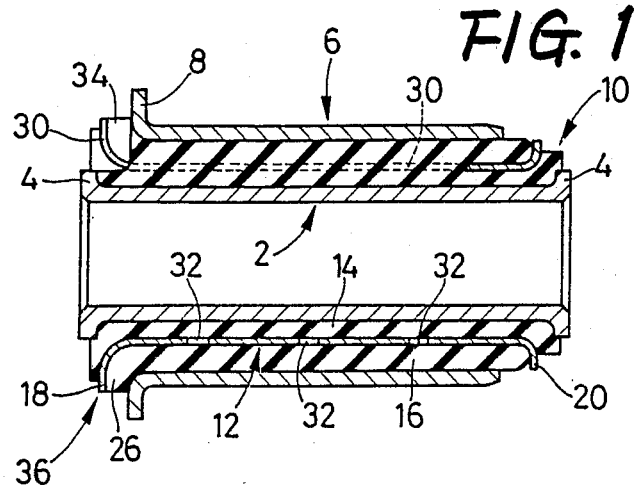
FIG. 1 is an elevational view in longitudinal cross section of a resilient bushing embodying the present invention, taken along line I—I of FIG. 2.
Figure 2:
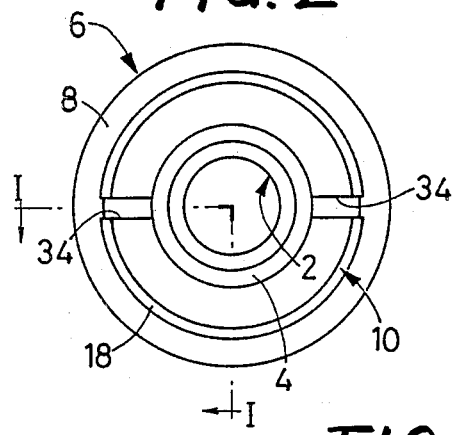
FIG. 2 is a left-hand side end elevation of the resilient bushing of FIG. 1.

Referring first to FIGS. 1 and 2, there is shown a resilient bushing, wherein reference numeral 2 designates a cylindrical inner metal sleeve which has outward annular flanges 4 at its opposite axial ends. The outward flanges 4 extend outwardly from the periphery of the corresponding open ends of the sleeve by suitable distances. A cylindrical outer metal sleeve 6 is disposed around and radially spaced a predetermined distance from the inner metal sleeve 2 such that the inner and outer metal sleeves 2, 6 are co-axial with each other. The outer metal sleeve 6 has, at its one end, an outward flange 8 which extends radially outwardly from the periphery of the sleeve by a predetermined distance. Between the inner and outer metal sleeves 2, 6, there is disposed a shock-absorbing or vibration-damping resilient member in the form of a rubber sleeve 10 so that an annular space formed between the sleeves 2, 6 is filled with a mass of rubber of the rubber sleeve 10.

Within the rubber sleeve 10 between the inner and outer metal sleeves 2, 6, there is embedded a cylindrical, rigid intermediate sleeve 12 which is made of a suitable rigid material such as iron and steel, such that the intermediate sleeve 12 is disposed co-axially with the inner and outer metal sleeves 2, 6. The intermediate sleeve 12 separates the rubber sleeve 10 into an inner rubber layer 14 and an outer rubber layer 16, primarily for increasing the spring constant of the rubber sleeve 10 in the radial direction to protect the rubber sleeve 10 against excessive radial deformation or deflection. The intermediate sleeve 12 is also provided, at its opposite axial ends, with first and second outward annular flanges 18, 20 which extend radially outwardly. The distance of radial extension of the first outward flange 18 is selected to be longer than that of the second outward flange 20. The first and second outward flanges 18, 20 are at least partially exposed out of the rubber sleeve 10, and the outer layer 16 of the rubber sleeve 10 located radially outwardly of the intermediate sleeve 12 is restricted at its opposite axial ends by the first and second outward flanges 18, 20.

Figure 4:
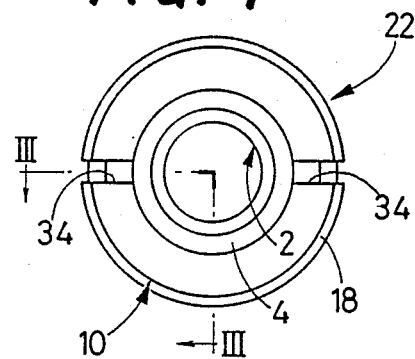
FIG. 4 is a left-hand side end elevation of the inner assembly unit of FIG. 3.
Figure 3:
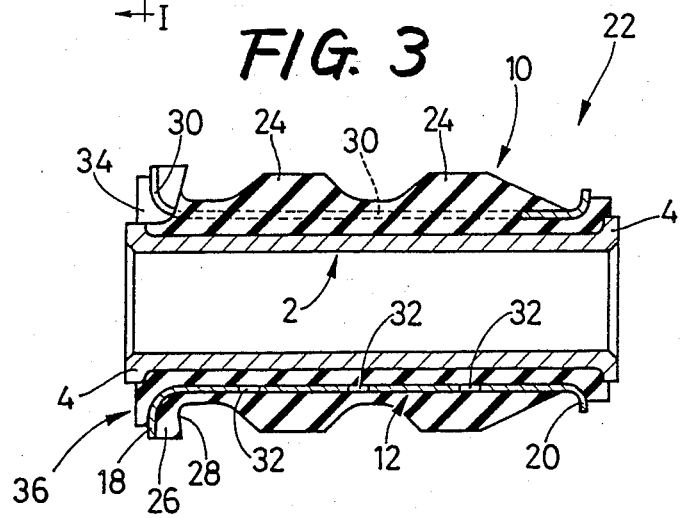
FIG. 3 is an elevational view in longitudinal cross section of an inner assembly unit used in the resilient bushing of FIG. 1, taken along line III—III of FIG. 4.

The resilient bushing thus constructed is manufactured preferably in the following manner:

Initially, an inner assembly unit 22, which consists of the inner metal sleeve 2, rubber sleeve 10 and intermediate sleeve 12 as shown in FIGS. 3 and 4 is prepared in a vulcanization process. Subsequently, the outer metal sleeve 6 is press-fitted on the prepared inner assembly unit 22. Described more specifically, the inner assembly unit 22 is obtained by setting the inner metal sleeve 2 and the intermediate sleeve 12 in a mold in a predetermined positional relation with each other, pouring a suitably fluidized unvulcanized rubber material into the mold, and vulcanizing the rubber material, so that the formed rubber sleeve 10 adheres to the outer surface of the inner metal sleeve 2, and so that the intermediate sleeve 12 is substantially embedded in the rubber sleeve 10 in co-axial relation thereto.

As shown in FIG. 3, the rubber sleeve 10 of the inner assembly unit 22 integrally formed by vulcanization has two annular radial projections 24, 24 which are spaced from each other in the axial direction of the unit 22. With the outer metal sleeve 6 forced on the inner assembly unit 22, the radial projections 24 are radially inwardly compressed so that the outer layer 16 has a constant thickness over almost the entire length thereof. One end portion 36 of the rubber sleeve 10 corresponding to the first outward flange 18 of the intermediate sleeve 12 is formed with a ring portion 26 which extends radially outwardly from the end of the sleeve 10. The ring portion 26 adheres to one of opposite surfaces of the first outward flange 18 which faces the second outward flange 20. As indicated in FIG. 3, the ring portion 26 is formed so that its width as measured along the axis of the inner assembly unit 22 is larger at its radially inner position than at its radially outer position, or increases in the radially outward direction, i.e., from its base toward its end, before the outer metal sleeve 6 is press-fitted on the inner assembly unit 22. More specifically, a surface 28 of the ring portion 26 opposite to the surface adhering to the first outward flange 18 is inclined such that the surface 28 approaches the second outward flange 20 as the surface 28 extends in the radially outward direction.

Figure 5:
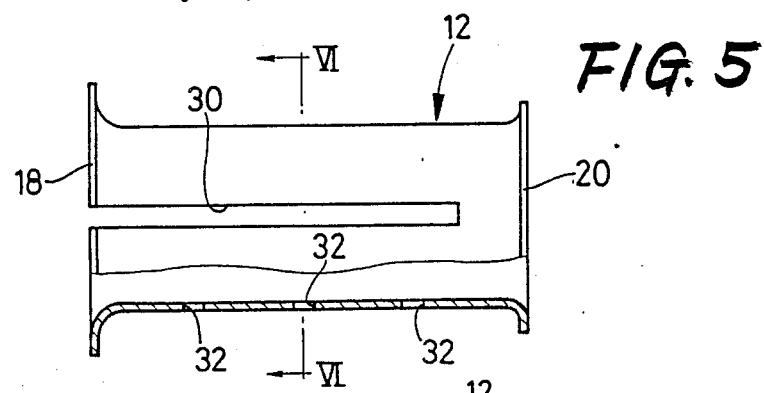
FIG. 5 is a partially cutaway, elevational view of an intermediate sleeve of the resilient bushing of FIG. 1.
Figure 6:
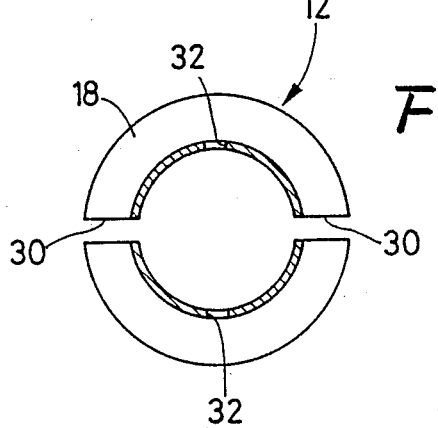
FIG. 6 is a view in cross section taken along line VI—VI of FIG. 5.

The intermediate sleeve 12 which is to be embedded in the rubber sleeve 10 has a length which is smaller than that of the inner metal sleeve 2, but larger than that of the outer metal sleeve 6 in which the inner assembly unit 22 is press-fitted. As illustrated in FIGS. 5 and 6, the intermediate sleeve 12 has a pair of axial slits 30, 30 which are formed along its axis from the axial end on the side of the first outward flange 18, to a position more or less near the other end. These axial slits 30, 30 are located in diametrically opposed relation to each other. In addition, the intermediate sleeve 12 has a total of six holes 32 which are formed in diametrically opposite positions which are equally spaced from the slits 30, 30 in the circumferential direction, as shown in FIGS. 5 and 6. Namely, two arrays of holes 32 (each array consisting of three holes 32) are formed in diametrically opposite positions of the intermediate sleeve 12, and the three holes 32 of each array are spaced from each other in the axial direction of the intermediate sleeve 12. It will be understood that when the rubber sleeve 10 is formed in the vulcanization process, the slits 30 and holes 32 are filled with the rubber material. The ring portion 26 of the rubber sleeve 10 has a pair of diametrically opposite rectangular grooves or recesses 34 adjacent to portions of the slits 30, 30 which are formed in the first outward flange 18 of the intermediate sleeve 12.

The outer metal sleeve 6 is forced on the thus constructed inner assembly unit 22 for pressed engagement of the outer surface of the rubber sleeve 10 with the inner surface of the outer metal sleeve 6. In assembling the resilient bushing, the end of the outer metal sleeve 6 on the side of the outward flange 8 is first brought into engagement with the right-hand side end (as seen in FIG. 3) of the inner assembly unit 22 on the side of the second outward flange 20. The outer metal sleeve 6 is then axially moved under pressure relative to the inner assembly unit 22 until the outward flange 8 comes into abutment on the inclined surface 28 of the ring portion 26 of the rubber sleeve 10, as shown in FIG. 1. With the outer metal sleeve 6 forced on the inner assembly unit 22, the unit 22 is subject to a radially inward compressive force, that is, the rubber sleeve 10 is radially inwardly compressed. In this connection, it is noted that the provision of the axial slits 30, 30 filled with the rubber material, i.e., the presence of the rubber material in the slits 30, 30, will cause more radial compression of the rubber sleeve 10 at its portion corresponding to the length of the axial slits 30 of the intermediate sleeve 12 than at the other portion of the rubber sleeve 10 corresponding to the other portion of the intermediate sleeve 12 which does not have the slits 30.

In the thus manufactured resilient bushing having the construction as shown in FIGS. 1 and 2, the rigid intermediate sleeve 12 co-axially embedded in the rubber sleeve 10 serves to give the resilient bushing relatively hard spring characteristics in its radial direction, without changing the hardness of the rubber material of the rubber sleeve 10. Stated the other way, the use of the rigid intermediate sleeve 12 has made it possible to reduce the hardness of the rubber material of the rubber sleeve 10 while maintaining relatively hard spring characteristics of the resilient bushing. The reduction in hardness of the rubber sleeve 10 itself results in improvement in spring characteristics of the resilient bushing in the circumferential direction, i.e., contributes to relatively soft spring characteristics upon application of a twisting load about the axis of the bushing.

Further, the first and second outward flanges 18, 20 formed at the opposite axial ends of the intermediate sleeve 12 act to restrict the corresponding ends of the rubber sleeve 10, in particular, the ends of the outer layer 16. In other words, the flanges 18, 20 function as stoppers which restrain relative axial displacements of the inner and outer metal sleeves 2, 6. Consequently, the resilient bushing has favorable spring characteristics wherein the rate of increase in deflection or strain of the rubber sleeve 10 in relation to an axial load applied thereto is reduced at a relatively low level of the axial load, up to which level the deflection is increased at a relatively high rate as the load is increased. Furthermore, the flanges 18, 20 prevent removal of the outer metal sleeve 6 from the rubber sleeve 10.

Further, the outward flanges 4, 4 formed at the opposite axial ends of the inner metal sleeve 2 also serve to amplify the retention of the rubber sleeve 10 to the inner metal sleeve 2. In addition, the outward flanges 4, 4 provide an extra area of contact of the inner metal sleeve 2 with retainers 60 (FIG. 8) which support a mounting bolt 58 (FIG. 8) to be inserted in the bore formed in the inner metal sleeve 2. This extra area of contact provides an increase in the amount of friction of the inner metal sleeve 2 with respect to the retainers 60, thus giving the inner metal sleeve 2 an increased resistance to a rotational force and thereby preventing the inner metal sleeve 2 from rotating about its axis.

As previously indicated, the outer metal sleeve 6 press-fitted on the inner assembly unit 22 is axially positioned relative to the rubber sleeve 20 such that the outward flange 8 of the outer metal sleeve 6 is held in pressed contact with the end portion 36 (left-hand side end as viewed in FIGS. 1 and 3) of the rubber sleeve 10, more precisely, with the ring portion 26 of the end portion 36. Since the end portion 36 of the rubber sleeve 10 is separated by the first outward flange 18 of the rigid intermediate sleeve 12, the elasticity of the end portion 36 is reduced. Accordingly, the outer metal sleeve may be easily axially positioned relative to the rubber sleeve 10 through abutment of the outward flange 8 on the end portion 36. In this connection, it is important to note that the ring portion 26 adjacent to the first outward flange 18 of the intermediate sleeve 12 is formed with the surface 28 which is inclined or tapered, as shown in FIG. 3, so that the width of the ring portion 26 (as measured in the axial direction) increases in the radially outward direction. This configuration of the ring portion 26 allows the outer metal sleeve 6 to be positioned with its outward flange 8 positioned comparatively near the first outward flange 18 of the intermediate sleeve 12, owing to the axial compression of the radially outward section of the ring portion 26. As a result, the axial displacement of the outer metal sleeve 2 toward the first outward flange 18 is relatively well restrained. In addition, the ring portion 26 with the inclined surface 28 exerts a comparatively small spring-back force on the outward flange 8 of the outer metal sleeve 6. Hence, there is a minimum possibility that a gap may develop between the inclined surface 28 and the first outward flange 18, due to the spring-back force of the ring portion 26.

Figure 8:
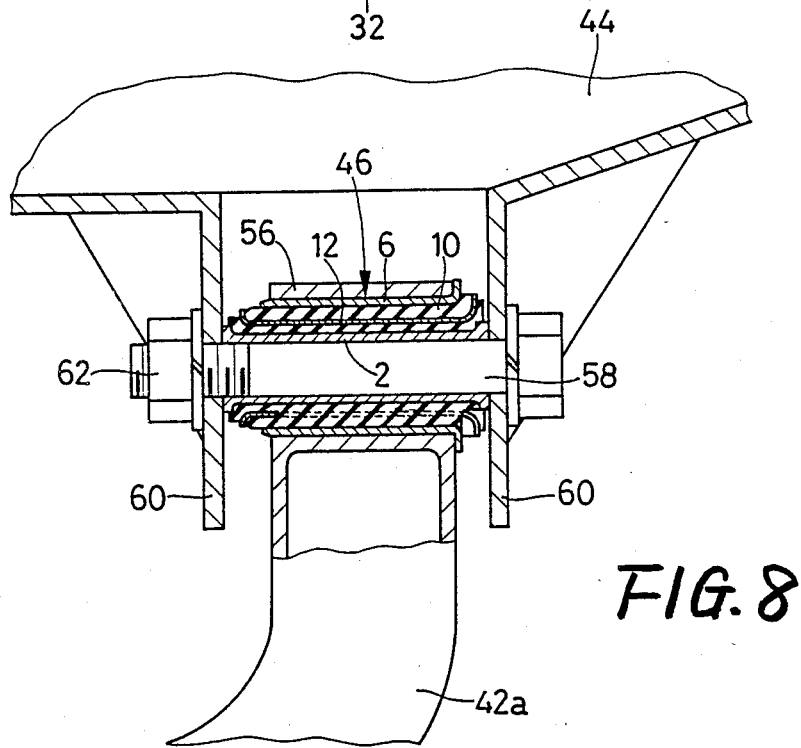
FIG. 8 is an enlarged view of a part of the rear suspension system indicated at A in FIG. 7.
Figure 7:
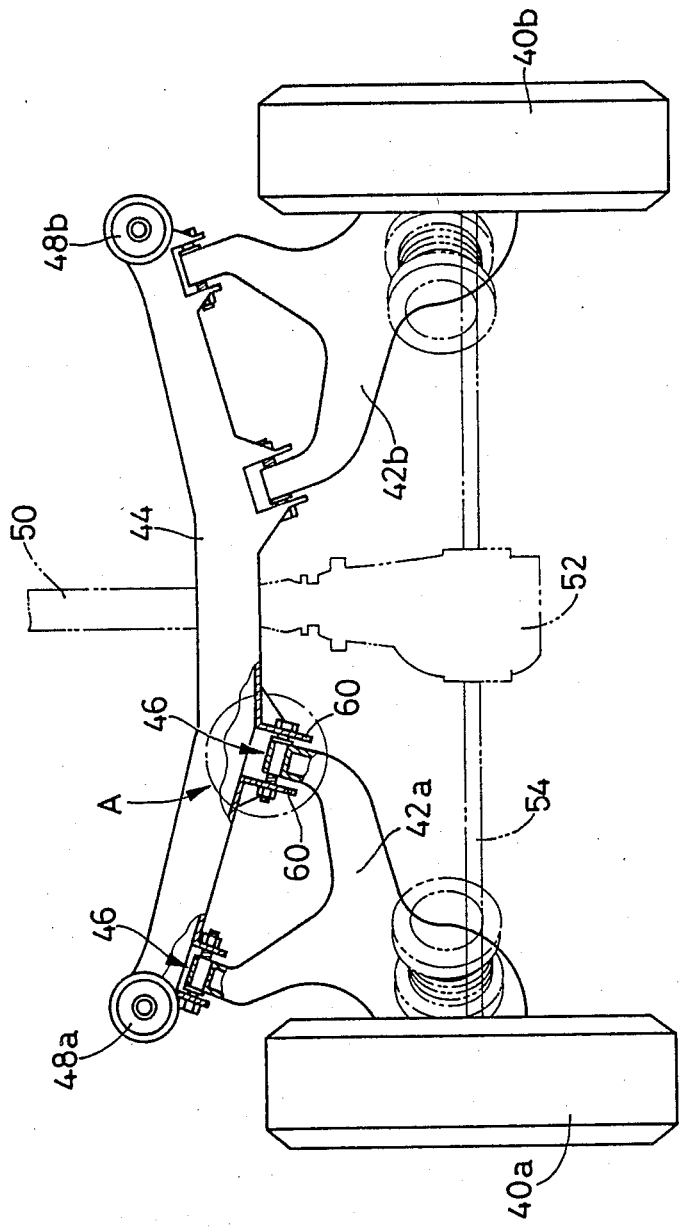
FIG. 7 is a schematic elevational view of a rear suspension system of semi-trailing arm type in which the resilient bushings of FIG. 1 are used.

The resilient bushing having the structural features which have been described hitherto is suitably used as arm bushings for resiliently connecting right and left suspension arms to a suspension member of a rear suspension system of independent type used in an automotive vehicle. For example, the instant resilient bushings may be used in a semi-trailing arm suspension system as illustrated in FIGS. 7 and 8, wherein left and right suspension arms 42a, 42b to which left and right rear drive wheels 40a, 40b are connected are adapted to support a suspension member 44 via the instant resilient bushings in the form of arm bushings 46. The suspension member 44 is attached to a frame of a vehicle via mounts 48a, 48b. Power from an engine is transmitted to the rear drive wheels 40a, 40b through a propeller shaft 50, a final drive unit 52 and a drive shaft 54.

Each of the suspension arms 42a, 42b is bifurcated so as to support the suspension member 44 at two positions. Each of the four arm bushings 46 at the junctions of the suspension arms 42a, 42b and the suspension member 44 is disposed relative to the arms 42a, 42b and the suspension member 44 as illustrated in enlargement in FIG. 8.

The arm bushing 46 is press-fitted in a bore of an arm eye 56 at the end of the corresponding suspension arm 42a (42b), such that the outer surface of the outer metal sleeve 6 is kept in pressed contact with the inner surface of the arm eye 56. The arm eye 56 with the arm bushing 46 press-fitted therein is coupled to retainers 60, 60 extending from the suspension member 44, by a mounting bolt 58 inserted through the inner metal sleeve 2 of the arm bushing 46. The mounting bolt 58 is tightened by a nut 62. Thus, the suspension arm 42a (42b) is connected to the suspension member 44 via the resilient arm bushing 46.

While FIG. 8 illustrates the condition in which the inner one of the two arm eyes 56 of the left suspension arm 42a is connected to the suspension member 44, the outer arm eye 56 of the suspension arm 42a is similarly connected to the suspension member 44, except that the arm bushing 46 is reversed in the axial direction, i.e., the longitudinal orientation of the arm bushing 46 and the bolt 58 shown in FIG. 8 is reversed. Similarly, the right suspension arm 42b is connected to the suspension member 44 via the arm bushings 46, which are disposed symmetrically with the arm bushings 46 for the left suspension arm 42a, with respect to the propeller shaft 50.

In the suspension system as illustrated in FIGS. 7 and 8, it is desired that the arm bushings 46 demonstrate relatively hard spring characteristics in its radial direction, for increased driving stability of the vehicle, and at the same time demonstrate relatively soft spring characteristics in its circumferential direction (in the direction of twist about its axis), for enhancement of the driving comfort. Further, it is preferred that the axial displacement of the rubber sleeve 10 be restricted for maximum cornering stability of the vehicle. All of these requirements are met by the instant resilient arm bushing 46 which uses the rigid intermediate sleeve 12 embedded in the rubber sleeve 10 as described hitherto. Described in more detail, the use of the rigid intermediate sleeve 12 makes it possible to lower the hardness of the rubber sleeve 10 down to Hs45 or so, while maintaining sufficiently hard spring characteristics in the radial direction, whereby the dynamic/static ratio is reduced so as to improve the shock-absorbing or vibration-damping capability to thereby enhance the driving comfort of the vehicle.

Further, the axial displacement of the rubber sleeve 10 is restricted by the previously discussed various stopper means for limiting or restraining the movement of the outer metal sleeve 6 relative to the inner metal sleeve 2, whereby the axial deflection or strain of the rubber sleeve 10 is increased at a relatively high rate as the axial load is increased, while the axial load is relatively low. Namely, the rate of increase in the deflection of the rubber sleeve 10 in relation to the axial load applied thereto is reduced at a relatively low level of the axial load. With these axial spring characteristics, the change in the toe angle of the drive wheels during a cornering run of the vehicle is reduced, and the cornering stability is increased.

While the resilient bushing according to the invention is suitably used as arm bushings for a suspension system of trailing-arm type, the application of the instant resilient bushing is not confined thereto, but may be equally suitably used in any other types of suspension systems, in which resilient bushings are required to exhibit hard radial spring characteristics and which are required to be limited in the axial relative displacement of the inner and outer sleeves.

Although the intermediate sleeve 12 of the illustrated bushing has the first and second outward flanges 18, 20 at the opposite axial ends, such a flange may be formed only at one axial end of the intermediate sleeve. In this instance, the displacement of the outer metal sleeve 6 relative to the inner metal sleeve 2 may be restricted in one of the opposite axial directions.

It will be obvious that the present invention may be embodied with various other changes, modifications and improvements which may occur to those skilled in the art without departing from the scope of the invention defined in the appended claims.

As is apparent from the foregoing description, the resilient bushing constructed according to the concept of the present invention comprises a rigid intermediate sleeve which is embedded in a cylindrical resilient member in co-axial relation thereto. The intermediate sleeve enables the resilient bushing to exhibit relatively hard spring characteristics in its radial direction, without having to increase the hardness of the resilient material. Stated differently, the rigid intermediate sleeve makes it possible to use a relatively soft resilient material for the resilient member, while maintaining relatively hard radial spring characteristics. The use of a soft resilient material enables the resilient bushing to exhibit relatively soft spring characteristics in its circumferential direction. Further, one or two radially outwardly extending flanges formed at one or both axial ends of the intermediate sleeve serve to restrain relative axial movements of the inner and outer metal sleeves, whereby the resilient bushing demonstrates axial spring characteristics in which the rate of increase in the deflection of the resilient member is reduced at a relatively low level of the axial load.

What is claimed is:

1. A resilient bushing having an inner sleeve, an outer sleeve disposed around the inner sleeve in co-axial and radially-spaced relation thereto, and a cylindrical resilient member interposed between the inner and outer sleeves, comprising:

an intermediate sleeve substantially embedded in said cylindrical resilient member in co-axial relation thereto, said intermediate sleeve having a first outward flange at one of its opposite axial ends and a second outward flange at its other axial end, said first outward flange extending radially outwardly of the intermediate sleeve by a distance which is greater than that of said second outward flange, said resilient member having a ring portion which extends radially outwardly from an axial end thereof, said ring portion adhering to one of opposite surfaces of said first outward flange of the intermediate sleeve which faces said second outward flange, a width of said ring portion as measured axially of the resilient member, before said outer sleeve is press-fitted on said inner assembly unit, being larger at a radially outer part thereof than at a radially inner part thereof, said inner sleeve, said intermediate sleeve and said resilient member being formed as an integral inner assembly unit, through vulcanization of a fluidized rubber material in a mold, said outer sleeve being press-fitted on said inner assembly unit and having, at one of opposite axial ends thereof, an outward flange which extends radially outwardly of the outer sleeve, said outward flange of the outer sleeve being held in pressed contact with said ring portion of the resilient member.

2. A resilient bushing as set forth in claim 1, wherein said intermediate sleeve separates said resilient member into an inner layer contacting said inner sleeve and an outer layer contacting said outer sleeve, at least one of said first and second outward flanges of the intermediate sleeve being at least partially exposed out of said resilient member, an axial displacement of said outer layer of the resilient member being restricted by at least one of said first and second outward flanges of the intermediate sleeve.

3. A resilient bushing as set forth in claim 1, wherein said intermediate sleeve has at least one axial slit which is formed along its axis and open only at one of opposite axial ends of the intermediate sleeve, said at least one axial slit being filled with a part of said resilient member, said outer sleeve being press-fitted on said inner assembly unit such that said one axial end of the outer sleeve corresponds to said one axial end of the intermediate sleeve.

4. A resilient bushing as set forth in claim 1, wherein said inner sleeve has an outward flange at each of its opposite ends, respectively, said outward flanges extending radially outwardly from the respective axial ends of the inner sleeve, an axial displacement of said resilient member being restricted by at least one of said outward flanges of the inner sleeve.

5. A resilient bushing as set forth in claim 1, wherein at least one of said first and second outward flanges of the intermediate sleeve is an annular outward flange which forms a doughnut shape.

6. A resilient bushing as set forth in claim 1, wherein said outer layer of the resilient member has a plurality of annular projections which project outwardly from an outer surface of the outer layer and are spaced from each other in an axial direction of the outer layer.

* * * * *

UNITED STATES PATENT AND TRADEMARK OFFICE
CERTIFICATE OF CORRECTION

PATENT NO. : 4,667,943
DATED : May 26, 1987
INVENTOR(S) : Toshio IZUMI et al.

It is certified that error appears in the above-identified patent and that said Letters Patent is hereby corrected as shown below:

Under [56] References Cited, U.S. Patent Documents, add --3,604,771  9/1971  Luzsicza--;

Under Foreign Patent Documents, add

--1,271,565  6/1968  Fed. Rep. of Germany 3,113,049  10/1982  Fed. Rep. of Germany 1,645,940  10/1952  Fed. Rep. of Germany 85,464  7/1965  France 1,162,881  9/1958  France 2,352,681  5/1977  France--.

Signed and Sealed this

Seventeenth Day of November, 1987

Attest:

DONALD J. QUIGG

*Attesting Officer*    *Commissioner of Patents and Trademarks*